United States Patent
McKechnie et al.

(10) Patent No.: US 11,390,960 B1
(45) Date of Patent: Jul. 19, 2022

(54) HIGH TEMPERATURE CORROSION RESISTANT COMPOSITE STRUCTURE CONSISTING OF RUTHENIUM AND ITS ALLOYS

(71) Applicant: Plasma Processes, LLC, Huntsville, AL (US)

(72) Inventors: Timothy N. McKechnie, Gurley, AL (US); Anatoliy Shchetkovskiy, Owens Cross Roads, AL (US)

(73) Assignee: Plasma Processes, LLC, Huntsville, AL (US)

( * ) Notice: Subject to any disclaimer, the term of this patent is extended or adjusted under 35 U.S.C. 154(b) by 0 days.

(21) Appl. No.: 15/718,693

(22) Filed: Sep. 28, 2017

Related U.S. Application Data

(60) Provisional application No. 62/400,706, filed on Sep. 28, 2016.

(51) Int. Cl.
*B01J 23/46* (2006.01)
*B01J 35/04* (2006.01)
*C25D 5/10* (2006.01)
*C25D 3/50* (2006.01)
*C25D 3/54* (2006.01)
*F02K 9/68* (2006.01)
*B64G 1/40* (2006.01)

(52) U.S. Cl.
CPC ............. *C25D 5/10* (2013.01); *B01J 23/462* (2013.01); *B01J 35/04* (2013.01); *C25D 3/50* (2013.01); *C25D 3/54* (2013.01); *B64G 1/401* (2013.01); *F02K 9/68* (2013.01); *F05D 2300/13* (2013.01); *F05D 2300/143* (2013.01); *F05D 2300/1432* (2013.01); *F05D 2300/2118* (2013.01); *F05D 2300/502* (2013.01); *F05D 2300/603* (2013.01); *F05D 2300/611* (2013.01)

(58) Field of Classification Search
CPC ........... B01J 23/462; B01J 35/04; C25D 5/10; C25D 3/50; C25D 3/54
See application file for complete search history.

(56) References Cited

U.S. PATENT DOCUMENTS

| | | | | |
|---|---|---|---|---|
| 3,268,305 A * | 8/1966 | Hagadorn | ................. | H01J 1/22 |
| | | | | 313/311 |
| 4,847,231 A * | 7/1989 | Gratzel | ................. | B01J 23/462 |
| | | | | 502/74 |
| 4,917,968 A | 4/1990 | Tuffias et al. | | |
| 6,510,800 B1 * | 1/2003 | Zaerr | ....................... | B61D 3/12 |
| | | | | 105/355 |
| 6,573,214 B2 * | 6/2003 | Abdo | ..................... | B01J 23/462 |
| | | | | 423/628 |
| 6,780,386 B1 * | 8/2004 | Fukunaga | .............. | B01J 23/462 |
| | | | | 423/212 |
| 7,214,331 B2 * | 5/2007 | Jiang | .................... | B01J 35/0006 |
| | | | | 252/373 |
| 7,544,634 B2 * | 6/2009 | Echigo | ................... | B01J 35/002 |
| | | | | 502/325 |
| 7,837,953 B2 * | 11/2010 | Shore | ................... | B01J 19/2485 |
| | | | | 422/211 |
| 7,858,065 B2 * | 12/2010 | Seki | ....................... | B01J 23/462 |
| | | | | 423/491 |
| 7,972,988 B2 * | 7/2011 | Kourtakis | ................ | B01J 21/18 |
| | | | | 429/400 |
| 8,093,178 B2 * | 1/2012 | Iwasa | .................. | H01M 8/0668 |
| | | | | 423/212 |
| 8,334,080 B2 * | 12/2012 | Takei | ....................... | B01J 23/42 |
| | | | | 427/115 |
| 8,361,924 B2 * | 1/2013 | Tanaka | ..................... | B01J 21/18 |
| | | | | 429/400 |
| 8,760,044 B2 * | 6/2014 | Ma | ......................... | H01T 13/39 |
| | | | | 313/141 |
| 9,090,981 B2 * | 7/2015 | Brichese | ................ | B01J 23/462 |
| 9,112,335 B2 | 8/2015 | Kenworthy | | |
| 9,566,567 B2 * | 2/2017 | Kim | ........................ | B01J 21/04 |
| 9,604,200 B2 * | 3/2017 | Farnell | ....................... | C01B 3/48 |
| 9,677,183 B2 * | 6/2017 | Kintrup | .................... | B01J 23/462 |
| 9,763,438 B2 * | 9/2017 | Munsell | ................. | A01N 25/34 |
| 9,981,236 B2 * | 5/2018 | Farnell | .................... | B01J 21/066 |
| 2004/0048114 A1 * | 3/2004 | Shore | ....................... | B01J 35/04 |
| | | | | 422/211 |
| 2004/0166396 A1 * | 8/2004 | Gorer | ..................... | H01M 4/921 |
| | | | | 429/524 |
| 2006/0210846 A1 * | 9/2006 | Isozaki | ............... | H01M 8/0612 |
| | | | | 423/247 |

(Continued)

OTHER PUBLICATIONS

"Development of Metallic Foams Monolithic Catalysts for Green Monopropellants Propulsion", Space Propulsion 2016.

(Continued)

*Primary Examiner* — Cam N. Nguyen

(74) *Attorney, Agent, or Firm* — Atlanta Technology Law

(57) ABSTRACT

A structure which is resistant to corrosion at high temperatures comprises a layer of ruthenium and/or ruthenium alloy and a layer of a refractory metal having a high strength at high temperatures, such as rhenium. Further, the structure may include a layer of ceramic such as zirconia or hafnia on the exposed face of the ruthenium layer. Alternative embodiments of the present invention include a catalyst formed from a low strength support structure with a first metal layer and a second ruthenium catalytic layer on top of the first metal layer. Another alternative embodiment of the present invention includes the formation of high purity ruthenium electrodes that are resistant to corrosion at high temperatures.

18 Claims, No Drawings

(56) References Cited

U.S. PATENT DOCUMENTS

| | | | | |
|---|---|---|---|---|
| 2007/0243452 A1* | 10/2007 | Weidman | ................ | C23C 28/34 |
| | | | | 429/483 |
| 2007/0274899 A1* | 11/2007 | Wolf | ....................... | B01J 23/16 |
| | | | | 423/502 |
| 2009/0297924 A9* | 12/2009 | Shimazaki | ............ | B01J 23/462 |
| | | | | 502/180 |
| 2012/0266958 A1* | 10/2012 | Aksu | ....................... | C25D 5/50 |
| | | | | 136/262 |
| 2013/0177838 A1* | 7/2013 | Wang | ...................... | B01J 23/44 |
| | | | | 429/524 |
| 2013/0213799 A1* | 8/2013 | Bulan | ...................... | C25B 1/46 |
| | | | | 204/280 |
| 2014/0008215 A1* | 1/2014 | Brichese | ............ | C23C 18/1216 |
| | | | | 204/290.14 |
| 2015/0061486 A1 | 3/2015 | Kenworthy | | |
| 2015/0202598 A1* | 7/2015 | Kallesoe | ................ | B01J 35/026 |
| | | | | 429/524 |
| 2016/0361712 A1* | 12/2016 | Hosono | ................... | B01J 23/75 |
| 2018/0163314 A1* | 6/2018 | Cahalen | ................ | B32B 15/043 |
| 2020/0232111 A1* | 7/2020 | Cahalen | ................. | C22C 19/03 |

OTHER PUBLICATIONS

Peter I. Sorantin and Karlheinz Schwarz, Chemical Bonding in Rutile-Type Compounds, Inorg. Chem. 1992, pp. 567-576 (10 pages).

* cited by examiner

HIGH TEMPERATURE CORROSION RESISTANT COMPOSITE STRUCTURE CONSISTING OF RUTHENIUM AND ITS ALLOYS

PRIORITY CLAIM

This application claims priority to provisional U.S. Application Ser. No. 62/400,706 filed on Sep. 28, 2016, and fully incorporated herein by reference.

BACKGROUND OF THE INVENTION

This invention relates to high strength, high temperature corrosion resistant structures and their processes of preparation. More particularly, this invention relates to structures that can sustain heavy loads and withstand highly corrosive environments at greatly elevated temperatures and pressures for hours or even days. Non-limiting examples of these structures include catalysts and electrodes.

Previously, considerable difficulty had been experienced in providing structures which retain their structural integrity at temperatures in excess 2,000 degree centigrade while sustaining substantial structural loads. In general, materials which can withstand environments under which most materials catastrophically oxidize do not have the structural strength to withstand substantial loads. Conversely, materials which have substantial structural strength at elevated temperatures are generally subject to catastrophic oxidation. These material limitations have substantially hampered developments and performance in a number of fields including, for example, that of rocketry. Rocket thrust chamber assemblies have, for example, been operated at less than optimum conditions so as to keep the operating temperatures within the limits of the material which had heretofore been available for use in the construction of thrust chambers and nozzles. Even when less than optimum operating conditions were used, the life of previous thrust chamber assemblies was generally limited to a very few minutes before catastrophic structural failure occurred.

These and other difficulties of the prior art have been overcome according to the present invention which provides a high temperature, high strength, corrosion resistant structure which is capable of withstanding hot highly corrosive environments for several hours while supporting substantial structural loads.

According to the preferred embodiment of the present invention, electro chemical deposition procedures are utilized to form successive layers of a structure. Other deposition procedures can be used too such as chemical vapor deposition, physical vapor deposition, vacuum plasma spray, powder metallurgy, and additive manufacturing. A first corrosion resistance layer is provided which is capable of withstanding highly corrosive environments at temperatures in excess of 1,500 degrees centigrade and preferably in excess of 2,000 or 2,200 degrees centigrade. An optional second-high strength layer exhibits tensile strengths in excess of 5,000 and preferably 15,000 pounds per square inch at temperatures in excess of 1,500 and preferably in excess of 2,000 degrees centigrade. In general, the structures according to the present invention are composed of ruthenium and/or ruthenium containing alloys and refractory materials, preferably metals such as, for example, rhenium, tungsten, molybdenum, nickel, copper, or silver. The structures may, if desired, be coated with high temperature ceramic materials such as, for example, hafnium dioxide or zirconium dioxide.

According to an alternative embodiment of the present invention, carbon based materials can be coated with ruthenium which provides chemical and oxidation resistance. The carbon-based materials include graphite, silicon carbide, carbon/carbon composites, and foam. This carbon foam structure coated with ruthenium can be used as a high temperature monolithic catalyst bed. At temperatures in excess of 1,000 degrees centigrade, the catalyst will ignite and decompose any advanced monopropellants that are present in a green rocketry application. These structures can also be used to protect lightweight composites from oxidizing and corroding at elevated temperatures in excess of 1,000 degrees centigrade. An optional second-high strength layer exhibits tensile strengths in excess of 5,000 and preferably 15,000 pounds per square inch at temperatures in excess of 1,500 and preferably in excess of 2,000 degrees centigrade. In general, the structures according to this alternative embodiment are composed of ruthenium and/or ruthenium containing alloys and refractory materials, preferably metals such as, for example, rhenium, tungsten, molybdenum, nickel, copper, or silver. The structures may, if desired, be coated with high temperature ceramic materials such as, for example, hafnium dioxide or zirconium dioxide. Ruthenium can also be used as an electrode surface to extend a components operational life in oxidizing environments.

According to another alternative embodiment of the present invention, the low strength support structure may also be a lattice or shell consisting of ceramic powders, balls, or beads.

When thrust rockets are operated at the optimum oxidizer/fuel ratio, the temperature of the exhaust gas may be as high as 2,000 to 2,500 degrees centigrade. This is the condition at which the highest efficiency is achieved. It has heretofore been impossible to operate at these conditions because of the limitations imposed by the materials of construction for the thrust chamber assembly. An additional factor is of substantial significance in this area. Thrusters must be cycled on and off many times over their useful lives. The thrusters may cool between cycles to very low temperatures. Further, thrusters must withstand the forces imposed on space vehicles during launch and in use. The materials from which thrusters are constructed must withstand both structural and thermal shock. Brittle materials tend to fail rapidly because of an inability to withstand this shock. Premature failure because of cracking under shock greatly limits the useful life and reliability of the thruster. Very few materials or material combinations are capable of withstanding the shock loads, the structural loads, and the catastrophically corrosive conditions which are imposed on a rocket thrust chamber assembly. Previously the efficiency of thrust chambers had been substantially compromised by limiting the operating temperature to less than approximately 1,300 degrees centigrade and by limiting the number of cycles to which the thruster could be subjected.

Thrust chamber assemblies are used in space for the maneuvering of satellites and otherwise. Improving the efficiency of the thruster and extending its life provides a substantial number of new alternatives in space applications. The same thrust can be obtained with less fuel and thus less weight. The savings in weight can be distributed between additional fuel and additional payload. Extending the life of the thruster and the number of cycles which it can withstand prolongs the useful life of the satellite or vehicle upon which it is mounted. Increasing the effective fuel capacity of the vehicle also extends its useful life.

Many applications exist outside of the space field for structures which are capable of withstanding shock, and high structure loads in highly corrosive high temperature environments. The absence of such structures limits or precludes the use of some reactions in the chemical process industry. Such structures find application in propulsion systems and prime movers other than rockets. Other fields such as nuclear, metallurgical, and the like also require such structures to optimize or make possible various operations.

Ruthenium and ruthenium alloys are capable of withstanding highly corrosive high temperature conditions. However, ruthenium does not possess sufficient strength at high temperatures to withstand substantial loads. Certain refractory materials retain their strength at temperatures as high as 2,500 degrees centigrade or higher. Such refractory materials, however, are generally subject to rapid catastrophic oxidation at elevated temperatures.

Ruthenium is recognized as being a corrosion resistant element. It was, however, previously believed to be very brittle so that any significant elongation or flexing would cause it to fracture. It has been discovered that it is possible to form ductile ruthenium in useful shapes through the use of electrochemical deposition techniques. These shaped objects are highly corrosion resistant and are adapted to be used in an oxidative environment at temperatures in excess of approximately 1,500 degrees centigrade. Ruthenium alloys, formed through the sequential or code position of ruthenium and other materials also exhibit ductile characteristics.

A structure which is capable of withstanding high temperature, high stress, shock and catastrophically corrosive conditions can be produced according to the present invention by providing a corrosion bearer layer comprised of ruthenium and/or an alloy. Particularly advantageous results have been achieved through the use of elemental ruthenium as the corrosion resistant layer and rhenium as the load bearing layer. Ruthenium is conveniently deposited on a mandrel which is subsequently removed. Rhenium, another refractory metal, or carbon composite is next deposited over the ruthenium layer under conditions which cause the formation of a metallurgical bond between the ruthenium and rhenium. Other possible metal coatings include tungsten, molybdenum, copper and silver. The mandrel is removed leaving a free standing structure. The structure is shock resistant and not subject to cracking. The metallurgical bond between the layers is tight so that there is no tendency for the layers to delaminate.

The life of the structure can be further prolonged by the application of a ceramic coating on at least the surface of the ruthenium which is exposed to the hot corrosive environment. The ceramic coating is brittle and will crack but not spall off, particularly under repeated cycles, but will provide substantial protection for at least the initial part of the usage of the structure. Suitable ceramic coatings include, for example, hafnium dioxide and zirconium dioxide. The ceramic coating is formed by chemical vapor deposition, physical vapor deposition or plasma spray procedures and is joined to the corrosion resistant layer under conditions which cause the formation of a bonding interlayer between the ceramic and the corrosion resistant layers. Typically, the ceramic layer is deposited first on a mandrel under conditions where the ceramic layer does not bond to the mandrel and the corrosion resistant layer is next deposited over the mandrel onto the ceramic layer. However, the ceramic layer can be added directly on to a ruthenium layer with or without a bonding or gradient layer.

The preferred embodiment of the invention uses electrochemical deposition. Electrochemical deposition procedures are known and have been used for forming various coatings on conductive substrates by electrolysis of a solution containing the desired metal ion. The parameters which must be controlled for successful reliable operation include the choice of salt mixture and concentration of metal ions, the gas atmosphere of the reactor, the temperature of the reactor, and the nature of the substrate material, the geometry of the substrate, the temperature of the substrate, and the geometry of the reaction chamber. The nature of the deposit may be controlled by controlling these parameters. The crystal form of the deposition layer may, for example, sometimes be changed by changing these parameters. The degree of adherence to the substrate may be controlled, for example, by adjusting the temperature of the substrate. The deposits formed by electrochemical deposition are highly pure, greater than 99% purity, and dense structures greater than 99%.

Chemical vapor deposition procedures are known and have been used for the better part of a century for forming various coatings. In general, it is a method of plating on an atom by atom basis in which a gaseous compound of the material to be deposited is flowed over a heated substrate, resulting in the thermal decomposition or reduction of the compound and the subsequent deposition of the material onto the surface of the heated substrate. The parameters which must be controlled for successful reliable operation include the choice of gaseous compound, the concentration of the compound in the gas, the gas flow rate, the gas pressure, the nature of the substrate material, the geometry of the substrate, the temperature of the substrate, and the geometry of the reaction chamber. The nature of the deposit may be controlled by controlling these parameters. The crystal form may, for example, sometimes be changed by changing the gaseous compound. The degree of adherence to the substrate may be controlled, for example, by adjusting the temperature of the substrate. The deposits formed by chemical vapor deposition are highly pure. Materials may be codeposited depending upon the composition of the gas which is supplied to the reactor. If the deposit is thick enough it may be separated from the mandrel to leave a free stranding structure. Both metallic and non-metallic materials may be deposited using these techniques and they may even be codeposited. An interlayer can be deposited by chemical vapor deposition procedures.

Electrochemical deposition is the preferred manufacturing procedure. Other manufacturing procedures are possible such as chemical vapor deposition, physical vapor deposition, vacuum plasma spray, powder metallurgy and additive manufacturing.

Physical vapor deposition procedures are known and have been used for forming various coatings. In general, it is a method of using physical process to produce a vapor of material that is then deposited on the substrate forming a coating. The parameters which must be controlled for successful reliable operation include the choice of gaseous compound, the concentration of the compound in the gas, the gas flow rate, the gas pressure, the nature of the substrate material, the geometry of the substrate, the temperature of the substrate, and the geometry of the reaction chamber. The nature of the deposit may be controlled by controlling these parameters. The crystal form may, for example, sometimes be changed by changing the gaseous compound. The degree of adherence to the substrate may be controlled, for example, by adjusting the temperature of the substrate. The deposits formed by physical vapor deposition are generally very pure. Materials may be codeposited depending upon the composition of the gas which is supplied to the reactor. If the deposit is thick enough, it may be separated from the mandrel to leave a free stranding structure. Both metallic and non-metallic materials may be deposited using these techniques and they may even be codeposited. An interlayer can be deposited by physical vapor deposition procedures.

Vacuum plasma spray techniques can also be used to coat a substrate. Vacuum plasma spray can be used to provide a melted material sprayed onto a substrate in order to form a coating. The material is fed in powder or wire form, heated to a molten or semimolten state and accelerated towards the substrate in the form of micrometer-size particles. Combustion or electrical arc are an alternative to the thermal spray process.

Powder metallurgy generally consists of three basic steps: powder blending (pulverization), die compaction, and sintering. Compaction is the process of compacting metal powder in a die through the application of high pressure and usually done at room temperature. The powder is compacted into a desired shape and then ejected from the die cavity. Sintering is the process of placing the powder filled die under high heat for an extended period of time. While under high heat, bonding takes place between the porous aggregate particles and once cooled the powder has bonded to form a solid piece.

Additive manufacturing is a process used to synthesize a three-dimensional object by forming successive layers of material frequently formed under computer control to create layers on a substrate.

Hydrothermal growth, sometimes called hydrothermal synthesis, can be used to form ruthenium and ruthenium alloy coatings from high-temperature aqueous solutions at high vapor pressures. This formation method is done in an autoclave pressure vessel. The autoclave pressure vessel has thick steel walls and is generally cylindrically shaped with a hermetic seal that can withstand high temperatures and pressures for extended periods of time. The ruthenium rich nutrient is provided along with water or another solvent. When the ruthenium rich nutrient and aqueous solvent is heated it forms a saturated solution. A temperature gradient is formed and maintained between opposite ends of the autoclave pressure vessel. At the hotter end the ruthenium rich nutrient solvent dissolves, while at the cooler end a ruthenium coating is deposited and allowed to grow to the desired size. This formation method renders high quality, crystals while maintaining control over their composition.

Sol-gel processing can be used to form ruthenium and ruthenium alloy coatings on a substrate. The first step in sol-gel processing of ruthenium and ruthenium alloy coatings is to form a solution with a liquid phase and solid phase. The solid phase contains colloids of ruthenium or ruthenium alloys that tend to be uniformly sized particles. The solution is permitted to separate into its liquid and solid phases by either sedimentation or by centrifugation. Once separation has occurred, the solvent is removed by drying. The sol can be deposited on a substrate to form a film like coating by dip coating, spin coating, casting, or any other method used by one of skill in the art. A thermal treatment is then applied that adheres the sol to the substrate, and sintering, densification and grain growth occurs.

For the sake of convenience in describing and defining the process and the structure, the structure has been referred to as comprising various layers of materials. If desired, however, it is possible to provide a continuous variation in the composition of the structure from one pure material at one outer surface to another pure material at the opposed outer surface. Also, the variation in the composition need not be continuous. If ceramics are used on one outer surface it is possible to provide such a continuous variation in composition across three or more materials, not all of which are metallic.

Such graded deposits have no discontinuity and thus no stress concentration due to a mismatch of thermal expansion rates. Graded deposits are produced by varying the deposition parameters as the deposit builds up. The description and definition of the process and structure is intended to include such graded deposits.

In general, the deposition operation according to the present invention is controlled so that the first deposit is not necessarily chemically or metallurgically bonded to the mandrel. Subsequent deposits are bonded very tightly to one another. Adjustment of the temperature of the substrate and the period of time during which the substrate is subjected to elevated temperatures is the preferred means of controlling the extent and nature of the bond. The preferred temperatures should be determined for each specific situation, and may vary considerably from one application to another.

The requirement that the structure possess shock resistance and high strength at very high temperatures severely limits the choice of refractory materials for the high strength layer. Materials which have tensile strengths in excess of 5,000 pounds per square inch at 2,000 degrees centigrade include, for example, graphite, tungsten, Ta-10W, Mo-50Re, rhenium, and thoriated tungsten (W-1ThO.sub.2). Of these materials only W-1ThO.sub.2, rhenium and Mo-50Re have tensile strengths approximately in excess of 10,000 pounds per square inch at 2,000 degrees centigrade. Alloys, mixtures, and composites of these materials with each other and with other materials are also suitable for use as the structural layer. Some forms of graphite and/or carbon fiber are acceptable for use as the high strength layer when their linear coefficients of thermal expansion approximate that of the available corrosion resistant materials. The thickness of the structural layer is generally from about 0.5 to 1.5 mm although this can be adjusted depending upon the conditions of the end use of the structure. Thicker or thinner layers may be required or permitted in certain applications. High pressure applications require thicker structural layers.

The requirement that the corrosion resistant layer or barrier withstand shock and catastrophically corrosive conditions at temperatures in excess of 1,500 degrees centigrade and preferably in excess of 2,000 or 2,200 degrees centigrade for several hours severely limits the choice of materials for this layer or barrier. Ruthenium and ruthenium alloys are suitable candidates for this barrier. Iridium and ruthenium and their alloys with each other and with, for example, platinum, rhodium and osmium, are suitable candidates. The addition, for example, of approximately 30 percent platinum or rhodium to iridium reduces the melting point of the alloy to approximately 2,200 degrees centigrade but substantially increases the resistance of the material to oxidation. The thickness of the corrosion barrier is generally from about 12 to 250 micrometer (µm) although this can be adjusted depending upon the conditions of the end use of the structure. Thicker or thinner corrosion barriers may be required or permitted in certain applications. The corrosion barrier must be sufficiently ductile to permit some elongation without cracking. Elongations in excess of 4 percent and preferably in excess of 6 percent are effective to prevent cracking. Ruthenium structures which have been carefully prepared by electrochemical deposition procedures are inherently ductile. This permits the structural layer to deform somewhat under applied loads without destroying the integrity of the corrosion barrier. The structural layer would have to be very thick and heavy to resist deformation if the corrosion barrier were not ductile. Such a weight penalty would be unacceptable in many applications such as in space craft.

Where it is desired to protect exposed surfaces of the structure, and particularly the exposed surface of the corrosion barrier with a ceramic material, there are a number of possible suitable materials. Hafnium dioxide and zirconium dioxide are very suitable, particularly when stabilized with an inversion inhibitor. Yttria, for example, has been used to inhibit the crystalline inversion of hafnium dioxide. Crystalline inversion occurs with hafnium dioxide at approximately 1,600 degrees centigrade and causes cracking and spalling of hafnia coatings. Other borides, carbides and nitrides include for example, hafnium, tantalum, zirconium, tungsten, silicon and boron carbide, tantalum, hafnium, boron, zirconium, titanium and niobium nitride, hafnium, zirconium, tantalum, niobium and titanium boride. The ceramic layer, if used, is very thin and is not intended to provide the primary corrosion protection for the structural layer. The purpose of the ceramic barrier is to reduce the recession rate of the primary corrosion barrier. The ceramic and/or primary corrosion barrier may be applied to all of the exposed surfaces of the structure if desired. The thickness of the ceramic layer is generally 25 to 125 μm. This may be varied as conditions may require.

The following examples are submitted for the purpose of illustration only and not limitation.

A thrust chamber of conventional configuration having a length of 2.9 inches, a throat inside diameter of 0.17 inches, and a cylindrical chamber inside diameter of 0.35 inches was prepared. A removable mandrel was prepared with an exterior shape which matched the desired interior shape of the thruster chamber. A hafnia coating was deposited on the mandrel. The coating was allowed to build to a thickness of about 25 to 100 μm. A ruthenium layer was next deposited on the hafnia coating. The layer was allowed to build to a thickness of about 25 to 255 μm. A rhenium layer is then deposited over the coated mandrel. The rhenium layer was allowed to build to a thickness of about 1016 μm The mandrel was dissolved out chemically. Examination of the free standing structure revealed that bonding layers existed between the hafnia and the ruthenium and between the ruthenium and the rhenium.

As described above and shown in the associated drawings, the present invention comprises an apparatus for a nozzle. While particular embodiments of the invention have been described, it will be understood, however, that the invention is not limited thereto, since modifications may be made by those skilled in the art, particularly in light of the foregoing teachings. It is therefore contemplated by the appended claims to cover any such modifications that incorporate those features or those improvements that embody the spirit and scope of the present invention.

What is claimed is:

1. A high temperature corrosion resistant metallic structure comprising:
    a first layer comprising of ruthenium having a melting point in excess of approximately 1,500 degrees centigrade;
    a second layer of refractory material having a tensile strength of greater than approximately 5,000 pounds per square inch at a temperature of approximately 1,500 degrees centigrade; and
    a transition layer forming a metallurgical bond between the first and second layers, the transition layer comprising a solid solution of the materials in the first and second layers.

2. A high temperature corrosion resistant structure of claim 1 further comprising an interlayer between and metallurigically bonding the first layer of ruthenium to the second layer of refractory material.

3. A high temperature corrosion resistant structure of claim 2 including a ceramic layer on an exposed surface of the layer of ruthenium.

4. A high temperature corrosion resistant structure of claim 2 including a zirconium oxide layer on an exposed face of the layer of ruthenium.

5. A high temperature corrosion resistant structure comprising:
    a first layer of ruthenium, an interlayer of a solid solution of ruthenium and rhenium, the solid solution being ductile, and a layer of rhenium, the interlayer being between and metallurgically bonding the first layer of ruthenium to the layer of rhenium, the structure including a hafnia layer on an exposed face of the first layer of ruthenium.

6. A high temperature corrosion resistant structure comprising:
    a substrate structure having a melting point of 1,000 degrees centigrade or higher and having a tensile strength of 5,000 pounds per square inch or greater at 1,000 degrees centigrade or higher;
    a first ruthenium layer on the substrate structure, and
    a second ruthenium catalytic coating layer deposited on the first ruthenium layer.

7. A high temperature corrosion resistant structure according to claim 6, wherein the substrate is selected from the group consisting of metal, ceramic, carbon, and carbide.

8. A high temperature corrosion resistant structure according to claim 6, wherein the substrate structure has a tensile strength of approximately 2,500 to 5,000 pounds per square inch at about 1,000 degrees centigrade.

9. A high corrosion resistant structure according to claim 6, wherein the second ruthenium catalytic coating layer is deposited on the first high temperature corrosion resistant ruthenium layer by electrochemical deposition, chemical vapor deposition, plasma vapor deposition, vacuum plasma spray, powder metallurgy, additive manufacturing, hydrothermal growth, painting, dipping, or sol-gel processing.

10. A high temperature corrosion resistant structure according to claim 6, wherein the second ruthenium catalytic coating layer is selected from the group consisting of iridium, rhodium, and iridium-rhodium alloy.

11. A high corrosion resistant structure according to claim 10, wherein the second ruthenium catalytic coating layer is deposited on the first high temperature corrosion resistant ruthenium layer by electrochemical deposition, chemical vapor deposition, plasma vapor deposition, vacuum plasma spray, powder metallurgy, additive manufacturing, hydrothermal growth, painting, dipping, and sol-gel processing.

12. A catalyst comprising:
    a support structure with a first ruthenium layer; and,
    a second ruthenium catalytic layer on top of the first ruthenium layer.

13. A catalyst according to claim 12, wherein the support structure is a foam.

14. A catalyst according to claim 12, wherein the support structure is a lattice.

15. A catalyst according to claim 12, wherein the support structure is a shell.

16. A catalyst comprising:
    a structure with a first layer consisting of metal; and,
    a second layer consisting of an at least 99% pure ruthenium catalytic layer on top of the first layer.

17. The catalyst of claim 16, wherein the first layer consists of a metal selected from the group consisting of rhenium, tungsten, molybdenum, nickel, copper, and silver.

18. A ruthenium electrode consisting of at least 99% pure ruthenium with a greater than 99% dense structure produced by electrochemical deposition using ruthenium rich molten salts.

\* \* \* \* \*